United States Patent [19]

Kirsch

[11] 3,958,429
[45] May 25, 1976

[54] AIR-COOLED CONDENSER PRESSURE CONTROL AT LOW AMBIENT TEMPERATURES

[75] Inventor: Ralph R. Kirsch, Wexford, Pa.

[73] Assignee: Dravo Corporation, Pittsburgh, Pa.

[22] Filed: Jan. 17, 1975

[21] Appl. No.: 541,863

[52] U.S. Cl. .............................. 62/184; 62/DIG. 17
[51] Int. Cl.² ........................................ F25B 39/04
[58] Field of Search .............. 62/DIG. 17, 184, 183

[56] References Cited
UNITED STATES PATENTS

| | | | |
|---|---|---|---|
| 2,952,991 | 9/1960 | St. Pierre | 62/184 |
| 3,354,665 | 11/1967 | Lewis | 62/184 |
| 3,357,199 | 12/1967 | Harnish | 62/183 |
| 3,390,539 | 7/1968 | Miner | 62/184 |
| 3,402,565 | 9/1968 | Maynard | 62/183 |
| 3,469,413 | 9/1969 | Miner | 62/184 |
| 3,613,391 | 10/1971 | Harter | 62/184 |
| 3,633,376 | 1/1972 | Miner | 62/184 |
| 3,638,445 | 2/1972 | Lavigne | 62/184 |

*Primary Examiner*—Lloyd L. King
*Attorney, Agent, or Firm*—Parmelee, Miller, Welsh & Kratz

[57] ABSTRACT

This invention relates to a refrigeration system having an air-cooled condenser and, more particularly, to maintaining high-side pressure in the condenser at normal levels at low outdoor ambient temperature by the provision of a reversible cooling fan, cooling air being directed across the condenser in the conventional direction when the high-side pressure is above a predetermined level and diminishing the volume of cooling air flow across the condenser when the high-side pressure is below a predetermined level.

3 Claims, 2 Drawing Figures

AIR-COOLED CONDENSER PRESSURE CONTROL AT LOW AMBIENT TEMPERATURES

BACKGROUND OF THE INVENTION

In many commercial and industrial applications, refrigeration or air-conditioning systems are continuously operated irrespective of seasonal changes. In, for example, laboratories or computer installations which require maintenance of constant temperature conditions, the heat load on the refrigeration system is substantially the same in summer or winter. In air-cooled refrigeration systems, it is customary to locate the condenser outdoors thus subjecting the condenser to a wide variety of climatic conditions, especially in geographical locations which experience the full range of seasonal changes.

To maintain the cooling capacity of a refrigeration system, it is essential that an adequate pressure differential be maintained across the thermal expansion valve to maintain an adequate mass flow of refrigerant through the system. As is well known, the condensing pressure within an air-cooled condenser is a function of outdoor ambient temperature. As outdoor ambient temperature drops, pressure within the condenser also drops while the condensing rate increases resulting in a decrease in the mass flow of refrigerant through the expansion valve due to the decrease in pressure drop across the expansion valve.

The term "condensing pressure" is used synonymously with head pressure or high-side pressure. The "high side" of a refrigeration system is defined as that part of the system between the discharge side of the compressor and the inlet to the expansion valve. That part of the system between the outlet of the expansion valve and the suction side of the compressor is conventionally referred to as the low side.

Operating a refrigeration system at too low a high-side pressure can result in serious problems. For example, oil may be trapped in the condenser, the evaporator can be starved due to the insufficient mass flow of refrigerant through the expansion valve, and the suction gas superheat can reach a point where it cannot dissipate the heat of the compressor, thus causing the compressor to run hot.

A number of solutions to the problem of maintaining adequate high-side pressure in air-cooled condensors have been proposed. One such means is that of controlling the refrigerant flow in response to changes in condensing pressure, sometimes referred to as a "flooded condenser" system. However, this method is quite costly and presents a number of operational difficulties, in that a flooded condenser system requires nearly twice the refrigerant charge as compared to a conventional system. Moreover, the greater the refrigerant charge, the greater the problem of refrigerant migration becomes which can, for example, cause lock-outs of the oil pressure switch and cause damage to the compressor due to "liquid slugging". In addition to the increased size of equipment such as the receiver, an elaborate and costly pressure control system must be provided.

Another means of controlling high-side pressure is termed "air side control", wherein dampers are used to regulate the air flow across the condenser coils. The dampers are operated either in response to condenser pressure or temperature or can be operated by a piston device driven by the discharge pressure of the system. This type of control also suffers from several limitations and drawbacks. For example, the condenser fans must be of the non-overloading type, for when the dampers are closed, the increased static pressure will cause an increase in the fan motor current. Although this problem could be eliminated by installing a face and by-pass damper arrangement, the same is expensive and occupies too much of the interior space in the condenser. Even so, the dampers are prone to icing under wintry weather conditions and, as a result, often jam in the open or closed position, either of which could cause serious damage to the system.

It has also been proposed to control high-side pressure via the condenser fan itself. In such systems, a low range reverse-acting high pressure switch is used to sense high-side pressure and is connected in the fan circuit to stop the fan when the head pressure falls below a predetermined point and to start the fan when the head pressure rises to a predetermined point. In a variation of this control means, a modulated speed fan rather than an on-off fan is used the fan speed decreasing with decreasing high-side pressure and vice versa. However, there are two major drawbacks to the use of either on-off or variable speed fans. In the first instance, if such controlled fans are used with a horizontal condenser coil, wind velocity can prevent pressure from building up on the high side, thus causing the system to operate at a low head pressure and, if the load in the system under such conditions is normal, the superheat at the compressor could increase to a point causing burn-out of the compressor. In the second instance the said fan control systems are generally limited in their ability to maintain adequate high-side pressure whenever the outdoor ambient temperature falls below about 40°F.

OBJECT OF THE INVENTION

It is, therefore, an object of this invention to provide a means of maintaining adequate high-side pressure in an air-cooled condenser devoid of the aforesaid disadvantages. It is another object of this invention to provide an improved refrigeration system and an improved means of controlling and maintaining adequate high-side pressure in a refrigeration system having an air-cooled condenser, whereby an adequate pressure differential is maintained across the thermal expansion means to minimize evaporator starvation due to insufficient mass flow rate of refrigerant at low outdoor ambient temperatures.

BRIEF DESCRIPTION OF THE INVENTION

Generally speaking, the invention comprises providing a condenser fan capable of reversing its conventional direction of rotation when the condensing pressure reaches a predetermined minimum, thereby reducing the volume of cooling air flow across the condenser, and rotating in the conventional direction when the condensing pressure has attained a normal operating level, whereby the cooling air will flow across the condenser in the usual manner.

DETAILED DESCRIPTION OF THE INVENTION

Figure 1:
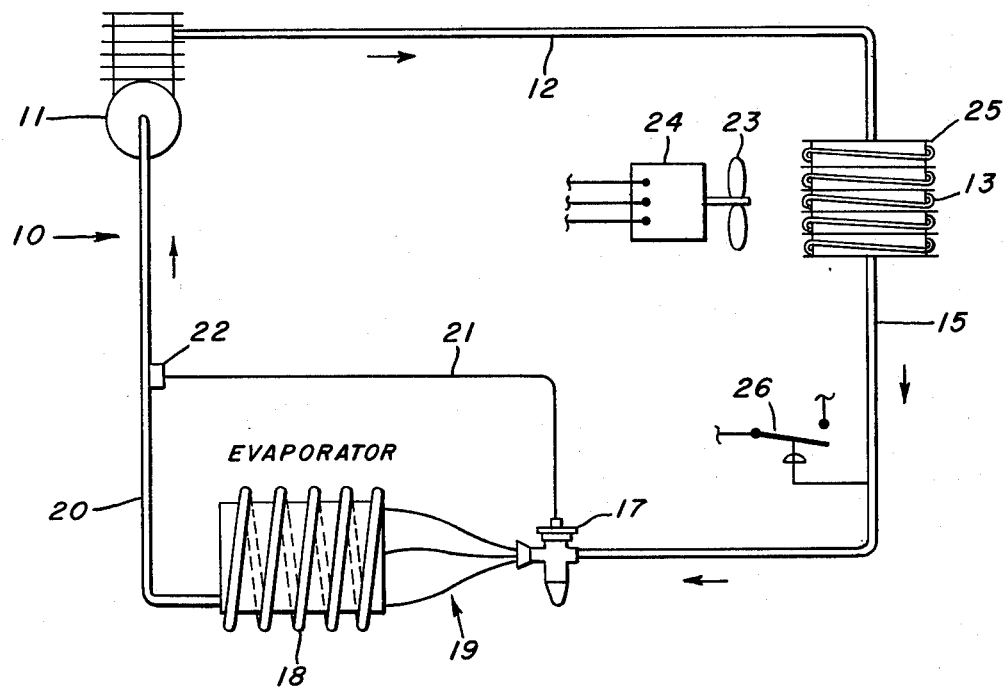
FIG. 1 is a schematic illustration of a typical refrigeration system embodying the invention.

With reference to FIG. 1, a typical refrigeration loop is depicted at 10. The system 10 includes a compressor 11 connected by a hot gas discharge line 12 to a condenser 13. The refrigerant liquid is passed via liquid line 15 through expansion valve 17 to the evaporator 18 via line 19. In the evaporator 18 the liquid refrigerant is endothermically vaporized and absorbs heat from the surroundings. The heated vapor then passes to the compressor 11 via suction line 20. A receiver (not shown) may be provided, if desired, the receiver being located between the condenser and the expansion valve.

The expansion valve 17 is a conventional thermal expansion valve provided with a capillary line 21 connecting the valve to a temperature sensing bulb 22 located on suction line 20. It is, of course, to be understood that other expansion means may also be used, such as capillary tubes or the like.

A fan 23 driven by a reversible motor 24 is operatively associated with condenser 13 and circulates cooling air over the condenser. The condenser 13 is usually provided with fins 25 to provide more sufficient transfer of heat from the hot refrigerant vapor to assure adequate cooling of the refrigerant. A pressure responsive switch 26 is located on liquid line 15 and is operatively connected to the fan motor 24 in a manner which will be described hereinafter. In a system in which a receiver is used the switch 26 should be located on the liquid line between the receiver and the expansion valve 17.

As beforementioned, as the outdoor ambient temperature drops, the pressure in the condenser also drops, and at ambient temperatures below 60°F., the decrease in high-side pressure becomes such that an adequate pressure drop cannot be maintained across the expansion valve, resulting in a decreased mass flow rate of refrigerant through the expansion valve resulting in evaporator starvation and concomitant operating problems. The effects of decreasing ambient temperature on high-side pressure is even more pronounced in condensers that are not protected from the wind. By reversing the direction of fan rotation in response to changes in high-side pressure, the reverse fan rotation will counteract or buck the wind at low ambient temperatures, thereby diminishing the volume of ambient air flow across the condenser and thus maintain high-side pressure at an adequate level. By way of example, at an ambient temperature of 0°F., an air-cooled condenser exposed to a wind speed of 27 m.p.h. will experience a pressure decrease equivalent to operating the condenser fan at 100% capacity. By rotating the condenser fan in the reverse direction at low outdoor ambient temperatures, the fan rotation counteracts the wind effect and the system head pressure will not be decreased as would be the situation on a system with on-off or modulated fans. Moreover, with the fan rotating in reverse, the condenser CFM is decreased by about 50 to 75% with a corresponding decrease in condenser capacity.

The combination of decreased condenser CFM and decreased condenser capacity will tend to maintain normal head pressure and permit sufficient mass flow through the expansion valve to satisfy the heat load in the evaporator.

It is to be understood for purposes of the following discussion that by "forward direction", as regards the rotation of the fan, is meant that the direction of fan rotation is such as to direct a flow of ambient cooling air over the condenser in the conventional manner. By "reverse direction", as regards the direction of rotation of the fan, is meant that the fan rotates such as to diminish the volume of ambient cooling air flow over the condenser, in the opposite direction.

Figure 2:
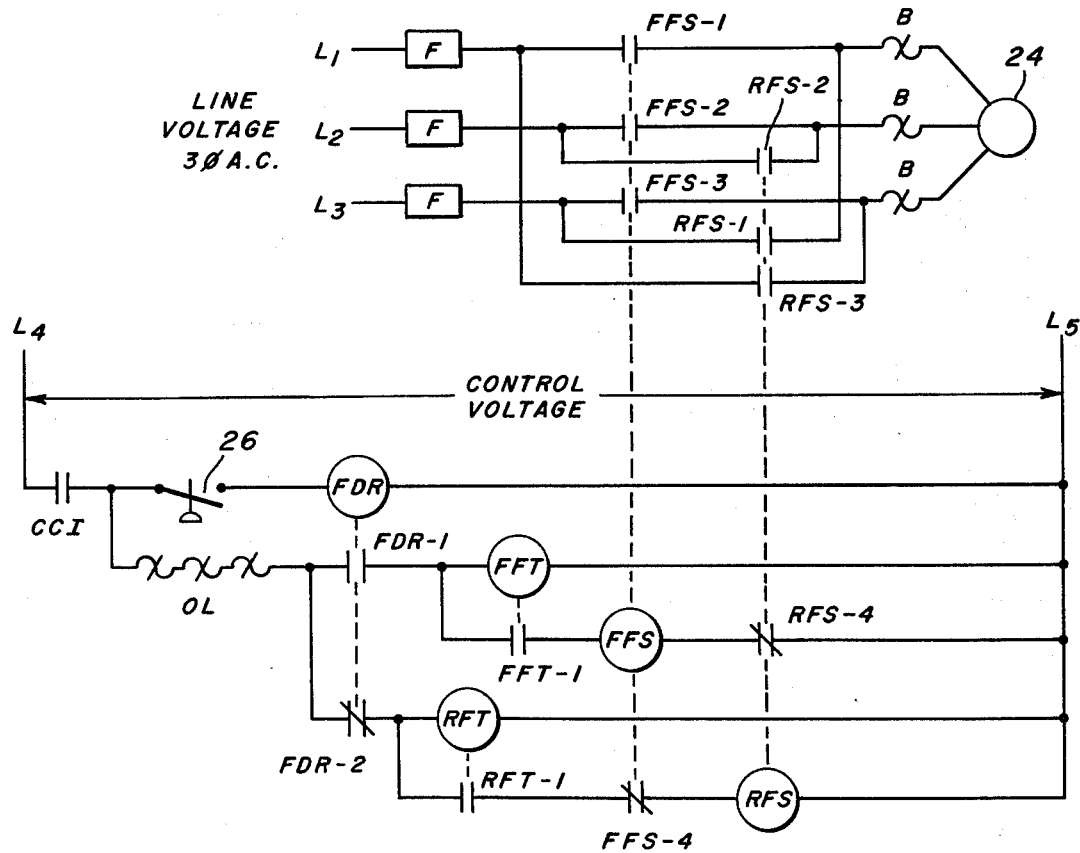
FIG. 2 is a schematic diagram of one embodiment of the fan control circuitry.

With reference to FIG. 2, a typical circuit for effecting forward and reverse rotation of the fan responsive to changes in high-side pressure is depicted. The motor 24 is connected to a source of three-phase alternating current via leads $L_1$, $L_2$ and $L_3$. The motor is protected from overloads in the usual manner by the provision of fuses, F, and circuit breakers, B. Normally open contacts FFS-1, FFS-2 and FFS-3 of forward fan starter relay FFS are operatively in the control circuitry to effect rotation of the fan in the forward direction and normally open contacts RFS-1, RFS-2 and RFS-3 of reverse fan starter relay RFS are operatively connected in the control circuitry to effect reversal of rotation of the fan. The control circuit is provided via leads $L_4$ and $L_5$ with a source of alternating current. The sequence of operation of the fan control system regardless of outdoor ambient temperature is as follows.

On a call for cooling, the compressor contact interlock CCI closes, energizing reverse fan timer relay, RFT, via normally closed contacts FDR-2. After a predetermined time interval, normally open contacts RFT-1 of relay RFT close, energizing reverse fan starter relay, RFS, which in turn closes contacts RFS-1, RFS-2, and RFS-3 causing the fan to rotate in the reverse direction. The fan will continue to rotate in reverse if the outdoor ambient temperature is low enough to reduce the condensing pressure below a predetermined operating level, the condensing pressure being sensed by pressure control switch 26. When the condensing pressure reaches its predetermined normal level, control switch 26 closes energizing fan directional relay, FDR, closing contacts FDR-1 and opening contacts FDR-2, thus energizing forward fan timer relay, FFT. After a predetermined time interval, normally open contacts FFT-1 of relay FFT close, energizing forward fan starter relay, FFS, which in turn closes contacts FFS-1, FFS-2 and FFS-3, contacts RFS-1, RFS-2 and RFS-3 being open, and the fan will rotate in the normal forward direction until the high-side pressure again drops below the predetermined level, at which time the sequence described above would be repeated and the fan would be caused to rotate in the reverse direction. It will be noted that overload protectors OL are provided in the control circuitry, as well as an interlock at normally closed contacts RFS-4 and FFS-4 to prevent the possibility of both the forward and reverse controls from actuating simultaneously.

It can be readily seen from the foregoing that the invention provides a simple, inexpensive means of maintaining adequate high-side pressure in air-cooled condensers. Moreover, existing refrigeration systems can be readily and economically adapted to incorporate the reversible fan installation of the invention. It is to be further realized that the normal high-side pressure will vary somewhat from one refrigeration system to another and will depend, for example, on the capacity of the system, the type of refrigerant used, and the like. For example, in a typical industrial refrigeration system, using "Freon-22" as a refrigerant liquid, a high-side pressure of at least about 140 psig, and preferably about 250 psig, should be maintained. However, the determination of the precise pressure at which a given refrigeration system will efficiently function is well within the skill of the art. Although the invention has been described with reference to the use of only one fan, it will also be understood that, depending on the type and size of the condenser and the amount of heat that must be dissipated, a plurality of fans may be used, all of which would function in the manner described with reference to a single fan.

An additional advantage derives from the invention in that reversing the flow of air over the condenser aids in keeping the condenser coils clean from accumulted dust, debris and other foreign objects which tend to become embedded in the fins thus reducing heat transfer efficiency. As, at the start of every cooling cycle, the fan will rotate in the reverse direction, thus will remove a large part of accumulated debris on one side of the condenser coil. As head pressure builds up to a normal level, the fan will rotate in the conventional forward direction, thus blowing off any foreign material that may be clinging to the other side of the condenser coil, Thus, as the condenser coils stay relatively clean, a potential source of difficulty as regards the compressor operating at too high a temperature is eliminated which could cause a lock-out of the pressure switch or cause burn-out of the compressor itself.

What is claimed is:

1. In a refrigeration system comprising a compressor, an air-cooled condenser having a liquid line, a refrigerant metering means and an evaporator, all of which are connected in series, including improved means for maintaining adequate high-side pressure in the system at low outdoor ambient temperatures to assure an adequate mass flow rate of refrigerant through the refrigerant metering means, the improvement comprising means for controlling the volume of ambient air flowing across the condenser in response to fluctuations in high-side pressure, said air flow controlling means comprising a fan arranged to direct a flow of ambient air across the condenser, drive means in operative engagement with said fan, said drive means being capable of rotating the fan in two directions, pressure sensing means located on the liquid line of the condenser, said pressure sensing means being in operative communication with said drive means such that the fan will rotate in one direction when the high-side pressure, as sensed by said pressure sensing means, is at or above a predetermined level to thereby direct the flow of ambient air across the condenser in the conventional direction, and such that the fan will rotate in the other direction when the high-side pressure drops below said predetermined level, as sensed by said pressure sensing means, to thereby counteract the flow of ambient air thus diminishing the volume of ambient air flowing across the condenser.

2. The improvement of claim 1 wherein said drive means is a reversible three-phase electric motor.

3. The improvement of claim 2 wherein said sensing means is a pressure responsive switch in operative electrical connection with said motor, said switch being responsive to fluctuations in high-side pressure whereby, when the high-side pressure is at or above a predetermined level, the motor will cause the fan to rotate in one direction thereby directing a flow of ambient cooling air across the condenser in the conventional direction and, when the high-side pressure drops below the predetermined level, the motor causes the fan to rotate in the other direction thereby diminishing the flow of ambient cooling air across the condenser.

* * * * *